April 25, 1933.　　　　P. P. BOGLEY　　　　1,905,958

RUBBER CLOTHESPIN

Filed Aug. 25, 1932

Inventor

PRESTON P. BOGLEY.

By J. B. Dickman, Jr.

Attorney

Patented Apr. 25, 1933

1,905,958

UNITED STATES PATENT OFFICE

PRESTON PEARCE BOGLEY, OF CHICAGO, ILLINOIS

RUBBER CLOTHESPIN

Application filed August 25, 1932. Serial No. 630,467.

The present invention relates to new and useful improvements in rubber clothespins.

The principal object of the present invention is to provide a clothespin made of rubber and so constructed that it is positively secured from displacement from the clothesline unless flexed by manual force.

Another object of my invention is a clothespin made of rubber that is unbreakable, one that is stain proof and one that will not mar the article it engages.

A further object of my invention is the provision of a clothespin made of rubber, the rubber being of a resilient texture affording easy engagement with an article and clothesline, upon which an article is suspended as well as accessible removal therefrom.

Other objects of the invention will be apparent from the following description of the present preferred form of the invention taken in conjunction with the accompanying drawing, wherein:—

Figure 1:
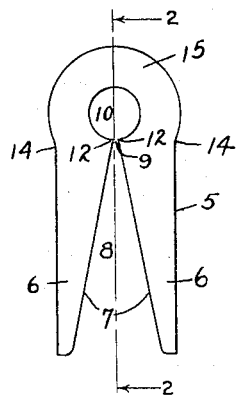
Figure 1, is an elevational view of a rubber clothespin constructed in accordance with the present invention.
Figure 2:
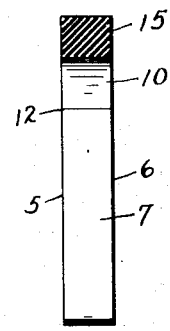
Figure 2, is a sectional view taken on line 2—2 of Figure 1.
Figure 3:
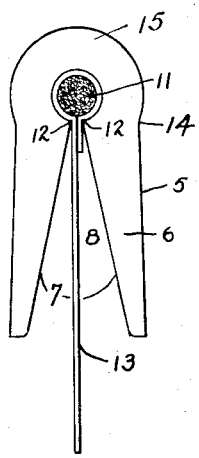
Figure 3, is an elevational view showing a clothespin constructed in accordance with the present invention, the clothespin engaging an article on a clothesline, the clothesline being shown in section.

Referring to the drawing illustrating the invention, the numeral 5, represents a clothespin constructed of resilient rubber and provided with a pair of legs 6. The inner walls 7 of the legs are inclined inwardly, toward each other forming a V-shaped mouth 8, and at the apex of the V-shaped mouth the walls are separated slightly, forming a throat 9 that enters into a transverse recess 10, for the reception of a clothesline 11, when the clothespin is positioned thereon. At the junction of the inner walls of the legs with the peripheral wall of the transverse recess, abutments 12 are formed serving as positive locking means for the article 13 suspended upon the clothesline 11. The abutments having sharp transverse edges prevent casual displacement of the clothespin from the clothesline. As shown, the abutments are shown to be of substantially V-shape configuration.

The outer walls of the legs 6 are approximately parallel and extend upwardly to a point 14, adjacent the abutments 12, where they merge into an annular head 15 of uniform thickness. It is to be noted that the legs increase in thickness upwardly, and that the greatest thickness of the clothespin is at the point of junction of the legs with the annular head. This construction affords greater tension when the clothespin is in engagement.

In the form of the invention disclosed, when the annular head is compressed under pressure or at the point 14, the legs flex outwardly, enlarging the throat 9, permitting the clothesline upon which articles are suspended to enter the recess 10, and when the pressure is released the inner peripheral wall of the recess encircles the article and the clothesline, the abutments locking the article securely on the clothesline.

What I claim is:—

1. A clothespin made of rubber, comprising a head and divergent legs extending therefrom, a V-shaped mouth between said legs, a throat at the apex of said V-shaped mouth, a transverse recess in said head into which said throat opens, abutments formed at the junction of the throat and transverse recess, said abutments being of substantially V-shaped configuration and defining sharp transverse edges providing a positive locking means for said clothespin, each of said legs being of greater thickness adjacent said head than at any other point therealong.

2. A clothespin made of rubber, comprising, an annular head of uniform thickness, a pair of legs extending therefrom, the inner walls of said legs converging toward said head, the outer walls of the legs being substantially parallel, said inner and outer walls merging into said annular head of uniform thickness, and a transverse recess in said annular head.

In testimony whereof, I affix my signature.

PRESTON PEARCE BOGLEY.